(12) United States Patent
Uchiyama et al.

(10) Patent No.: US 6,346,996 B1
(45) Date of Patent: Feb. 12, 2002

(54) FACSIMILE APPARATUS

(75) Inventors: Masahiro Uchiyama, Samukawa-machi; Yuichi Isokane, Chigasaki, both of (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/190,232

(22) Filed: Nov. 13, 1998

(30) Foreign Application Priority Data

Nov. 17, 1997 (JP) .............................................. 9-332455

(51) Int. Cl.⁷ .............................................. H04N 1/024
(52) U.S. Cl. ........................................ 358/473; 358/474
(58) Field of Search ................................ 358/400, 401, 358/473, 474, 494

(56) References Cited

U.S. PATENT DOCUMENTS

| | | | |
|---|---|---|---|
| 5,166,812 A | * 11/1992 | Dow | 358/498 |
| 5,402,251 A | 3/1995 | Ogasawara et al. | 358/473 |
| 5,497,245 A | * 3/1996 | Uchida | 358/406 |
| 5,602,650 A | * 2/1997 | Tamura | 358/400 |
| 5,663,811 A | 9/1997 | Shimizu | 358/473 |
| 5,848,373 A | * 12/1998 | DeLorne | 701/200 |
| 5,854,694 A | * 12/1998 | Payne | 358/473 |
| 6,104,508 A | * 8/2000 | Miyazaki | 358/474 |

FOREIGN PATENT DOCUMENTS

| | | | | |
|---|---|---|---|---|
| JP | 2-285764 | 11/1990 | ............ | H04N/1/04 |
| JP | 9-216748 | 8/1997 | ............ | H04N/1/12 |
| JP | 9-219779 | 9/1997 | ............ | H04N/1/04 |

OTHER PUBLICATIONS

English Language Abstract of JP 9-216748.
English Language Abstract of JP 9-219779.
English Language Abstract of JP 2-285764.

* cited by examiner

*Primary Examiner*—Jerome Grant, II
(74) *Attorney, Agent, or Firm*—Greenblum & Bernstein, P.L.C.

(57) ABSTRACT

In order to use plain paper without increasing the total size of the apparatus, the facsimile apparatus in the present invention houses hand scanner 300 in scanner section 3 which is provided at the front of facsimile apparatus main unit 1 via support 305 with the scanning side facing upward.

10 Claims, 7 Drawing Sheets

FIG. 1

PRIOR ART

FIG. 2

PRIOR ART

FACSIMILE APPARATUS

BACKGROUND OF THE INVENTION

1. Field of the Invention

The present invention mainly relates to facsimile apparatuses equipped with a hand scanner which is detachable from the main unit.

2. Description of the Related Art

Figure 1:
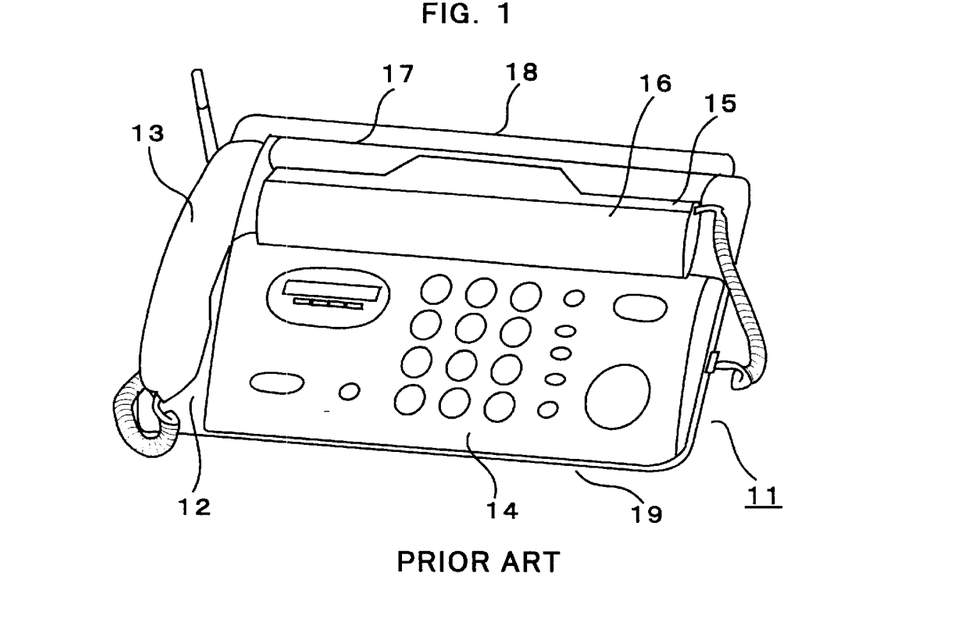
FIG. 1 illustrates an overall perspective view showing a conventional facsimile apparatus with a hand scanner attached.
Figure 2:
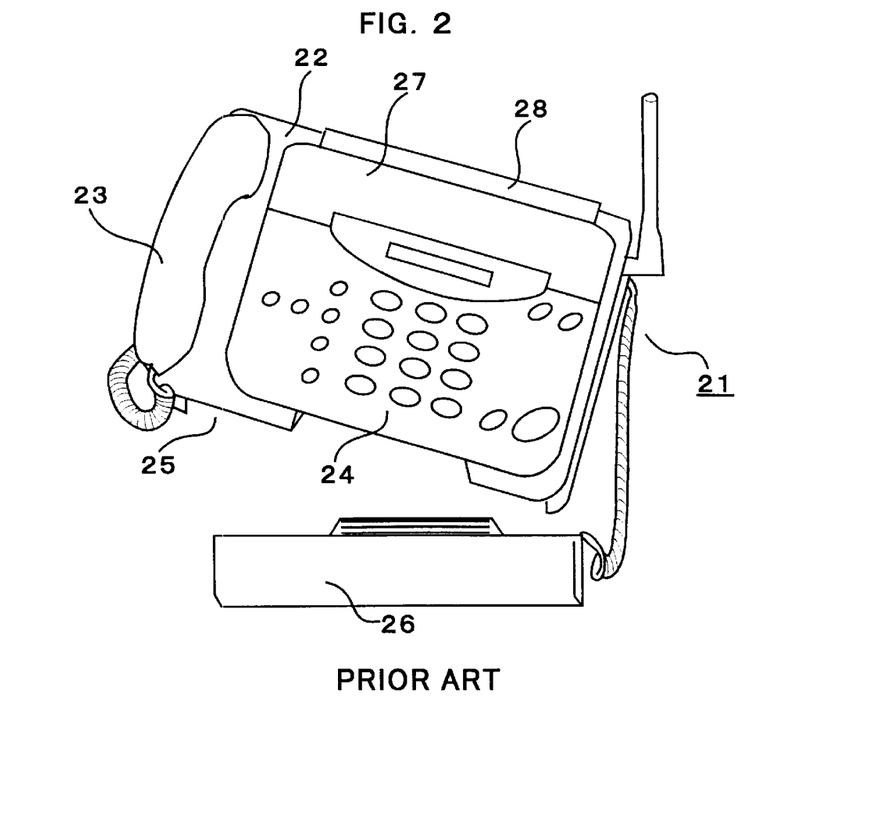
FIG. 2 illustrates an overall perspective view of a facsimile apparatus with a hand scanner detached from the apparatus.

With reference to FIG. 1 and FIG. 2, a conventional facsimile apparatus is explained below.

FIG. 1 is an overall perspective view showing a conventional facsimile apparatus. In FIG. 1, receiver holding section 12 is provided at the left (from the viewer's viewpoint) of the principal plane of facsimile apparatus main unit 11 and receiver 13 is placed on receiver holding section 12. Operation panel 14 is provided at the center of facsimile apparatus main unit 11. Facsimile transmission operation buttons, etc. are formed on this operation panel 14.

In the upper part of facsimile apparatus main unit hand scanner 16 to scan documents. In this case, the scanning side which is not shown in the figure of hand scanner 16 faces downward, that is, toward the interior of the main unit.

Furthermore, on the back of the upper part of facsimile apparatus main unit 11 is document inlet 17 into which documents to be sent are inserted and recording paper outlet 18 that discharges recording paper which has recorded received data. On the lower part of the front of the main unit is document outlet 19 that discharges scanned documents. Furthermore, inside facsimile apparatus main unit 11 is rolled recording paper which is not shown in the figure.

Then, the document transmission operation of the conventional facsimile apparatus configured as shown above is explained below.

First, the case where documents are transmitted with hand scanner 16 set in scanner housing section 15 is explained.

Since the scanning side of hand scanner 16 faces downward, a document is inserted into document inlet 17 with its printed side facing upward. Then, pressing an appropriate operation button on operation panel 14 causes the document feeding roller which is not shown in the figure to start running and the document is fed into the interior of facsimile apparatus main unit 11.

When the document reaches the scanning side which is not shown in the figure of hand scanner 16, scanning of the document is started. The scanned image data is stored in memory temporarily and then transmitted to the destination via a public telephone line. The scanned transmitting document is discharged from document outlet 19.

Then, the case where documents are transmitted with hand scanner 16 detached from the main unit is explained. The operator catches hand scanner 16 by hand and removes it from facsimile apparatus main unit 11. Then, the operator places hand scanner 16 on a document to be scanned and checks the scanning position. Pressing the scanning start button which is not shown in the figure will start scanning. The operator slides hand scanner 16 across the document at an appropriate speed. When the scanning is completed, the operator sets hand scanner 16 in scanner housing section 15.

Then, the reception operation of the conventional facsimile apparatus is explained below.

Upon reception of data from the sender, recording operation is started. The paper feeding roller which is not shown in the figure starts running to feed rolled recording paper. This rolled recording paper is attached inside the main unit in order to reduce the size of facsimile apparatus main unit 11. The recording block which is not shown in the figure records the received data on recording paper and the recording paper which has recorded the received data is discharged from recording paper outlet 18.

Then, another conventional facsimile apparatus different from the facsimile apparatus above is explained with reference to FIG. 2. FIG. 2 is an overall perspective view showing a conventional facsimile apparatus. In FIG. 2, receiver holding section 22 is provided at the left (from the viewer's viewpoint) of the principal plane of facsimile apparatus main unit 21 and receiver 23 is placed on receiver holding section 22. Operation panel 24 is provided at the center of facsimile apparatus main unit 21. Facsimile transmission operation buttons, etc. are formed on this operation panel 24.

In the lower part of the front of facsimile apparatus main unit 21 is concave scanner holding section 25 which houses hand scanner 26. When hand scanner 26 is set in scanner holding section 25, the scanning side which is not shown in the figure of hand scanner 26 faces downward. This concave scanner holding section 25 also functions as a document outlet to discharge scanned transmitting documents.

Furthermore, on the rear of the upper part of facsimile apparatus main unit 21 is detachable cover 27. When this cover 27 is opened, the transmitting document inlet which is not shown in the figure appears. On the back of facsimile apparatus main unit 21 is recording paper outlet 28 that discharges recording paper which has recorded receive data. Furthermore, inside facsimile apparatus main unit 21 is rolled recording paper which is not shown in the figure.

The document transmission/reception operation of the conventional facsimile apparatus configured as shown above is the same as the transmission/reception operation of the conventional facsimile apparatus described above, and thus its explanation is omitted here.

The conventional facsimile apparatus above has a configuration in which rolled recording paper is attached inside the apparatus main unit in order to reduce the size of the apparatus. However, it is difficult to have a configuration that will allow the apparatus to use plain paper. That is, the conventional facsimile apparatuses above have the problem that it is difficult to incorporate a paper feeding cassette that houses plain paper and a hand scanner which is detachable from the main unit simultaneously without increasing the size of the main unit with respect to the mounting position of the hand scanner.

The conventional facsimile apparatus shown in FIG. 1 incorporates hand scanner 16 in the upper part of facsimile apparatus main unit 11, which prevents it from setting the paper feeding cassette carrying plain paper in the upper part of the main unit. In addition, setting the paper feeding cassette inside facsimile apparatus main unit 11 will increase the size of the apparatus.

On the other hand, the conventional facsimile apparatus shown in FIG. 2 houses hand scanner 26 in concave scanner housing section 25 in the lower part of the front of facsimile apparatus main unit 21, which makes it easy to set the paper feeding cassette carrying plain paper in the upper part of the rear of facsimile apparatus main unit 21. However, since hand scanner 26 is attached with its scanning side facing downward, when documents are transmitted with hand scanner 26 attached, documents will have to pass through a crooked path. This makes it difficult to send documents smoothly, causing the problem of increasing the probability of document clogging or paper jam.

The present invention is intended to solve such a problem and it is an objective of the present invention to provide a facsimile apparatus with a detachable hand scanner which will allow the use of plain paper without increasing the size of the apparatus.

SUMMARY OF THE INVENTION

A first objective of the present invention is to allow the use of plain paper without increasing the size of a facsimile apparatus with a hand scanner.

The present invention achieves the objective above by setting the hand scanner in the front of the facsimile apparatus main unit with its scanning side facing right upward.

DETAILED DESCRIPTION OF THE PREFERRED EMBODIMENT

With reference now to the attached drawings, the embodiment of the present invention is explained in detail below.

The embodiment of the present invention is explained with reference to the drawings.

Figure 3:
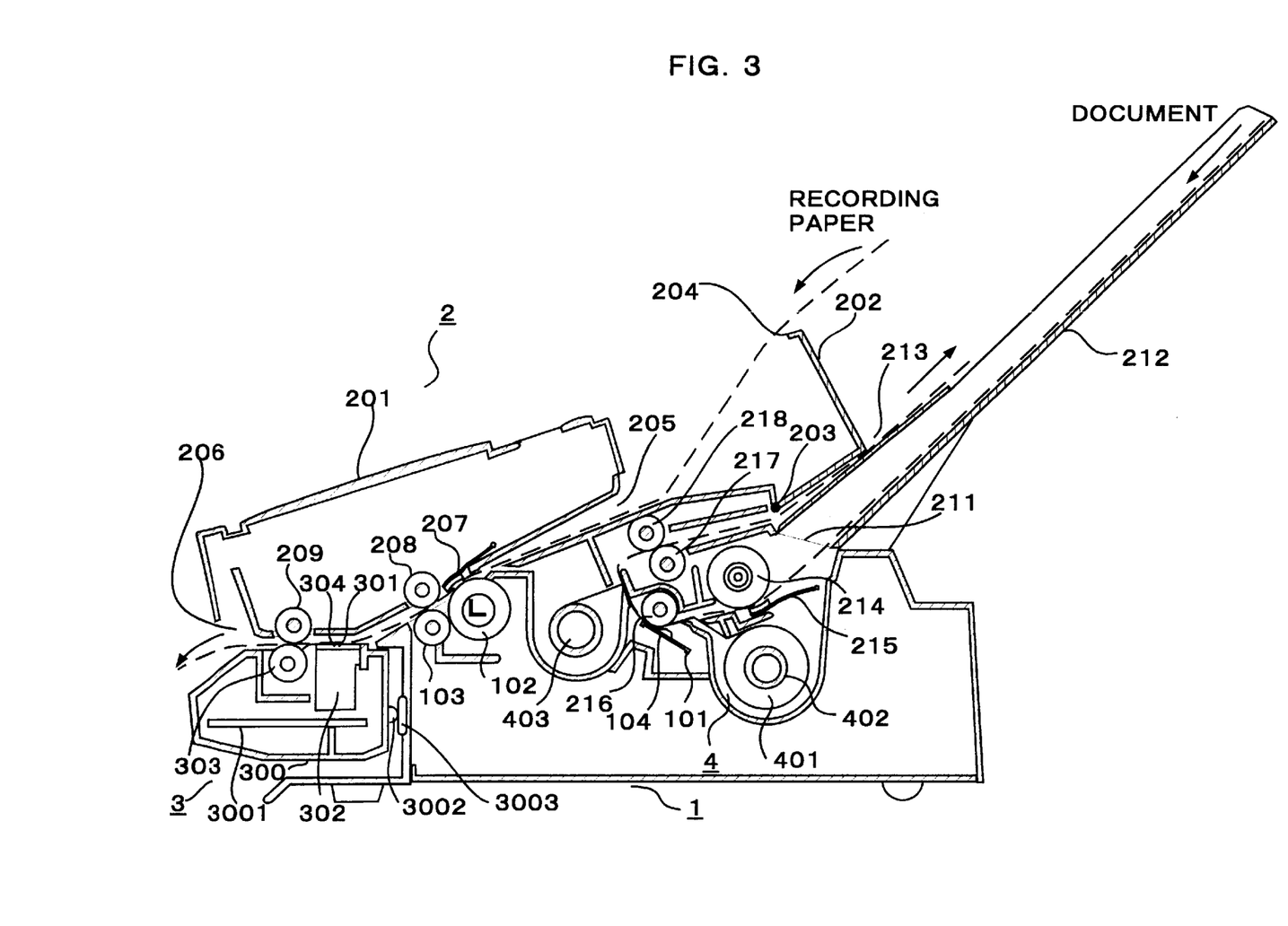
FIG. 3 illustrates a schematic sectional view showing the overall configuration of a facsimile apparatus according to an embodiment of the present invention.

FIG. 3 illustrates a schematic sectional view showing the overall configuration of a facsimile apparatus according to an embodiment of the present invention. In the explanation below, suppose that the direction in which recording paper is sent is forward and the opposite direction is backward.

As shown in FIG. 3, the facsimile apparatus according to the present embodiment comprises facsimile apparatus main unit 1, operation panel 2, and scanner section 3. Operation panel 2 is fixed to the upper part of facsimile apparatus main unit 1 in a pivotable manner by means of a rotation shaft which is not shown in the figure. Scanner section 3 will be explained later.

Facsimile apparatus main unit 1 incorporates ink film unit 4 with hot melt ink to be transferred to recording paper applied thereto. This ink film unit 4 comprises ink film 401 with hot melt ink applied onto its base material, supply reel 402 that has the ink film completely wound around before use and winding reel 403 that winds up the ink film according to the recording transfer operation. Ink film unit 4 is placed inside facsimile apparatus main unit 1 so that supply reel 402 may be positioned behind winding reel 403. While recording data, winding reel 403 rotates counterclockwise in FIG. 3 in synchronization with the recording paper transfer operation to wind up ink film 401 accordingly.

Facsimile apparatus main unit 1 has a frame structure and the upper part of the front of this main unit 1 serves as a guide to documents carried during document scanning operation. Furthermore, this facsimile apparatus main unit 1 houses recording head 101, auto document feed (hereafter referred to as "ADF") roller 102, document feed roller 103 and a power unit and control board, etc. which are not shown in the figure.

Recording head 101 is placed between supply reel 402 and winding reel 403 in ink film unit 4. This recording head 101 heats up during recording transfer operation, melting ink of ink film 401 and transfers it to recording paper carried to recording position 104.

ADF roller 102 is placed in the upper part of the front inside facsimile apparatus main unit 1 and rotates counterclockwise in FIG. 3 during document scanning operation. Document feed roller 103 is placed in the direction in which recording paper from ADF roller 102 advances and rotates counterclockwise in FIG. 3. Both have the function to carry documents to scanner section 3.

Operation panel 2 has a frame structure and the lower surface of this operation panel 2 serves as a guide to documents carried during recording transfer operation or documents carried during document scanning operation. Various operation buttons 201 are placed on the upper surface of operation panel 2. The user can manipulate the facsimile apparatus to perform various operations by pressing operation buttons 201.

Document tray 202 in which documents are set is placed on the rear of the upper surface of operation panel 2. The document tray 202 is attached to operation panel 2 in a pivotable manner centered on hinge 203. Opening this document tray 202 allows documents to be set and allows documents to be received at tip 204 of document tray 202. On the other hand, when no document is sent, closing document tray 202 will be effective in protecting document inlet 205 from dust.

The gap between operation panel 2 and scanner section 3 serves as document outlet 206 that discharges scanned documents.

At the front of operation panel 2 are document separation pad 207, document pinch roller 208 and document discharge roller 209. Document separation pad 207 is placed opposite to ADF roller 102 and stays in contact with ADF roller 102 so that only one sheet can be separated from a plurality of document sheets. Document pinch roller 208 is placed opposite to document feed roller 103 and assists in carrying documents to scanner section 3 smoothly.

Document discharge roller 209 is placed opposite to encoder roller 303 and rotates clockwise in FIG. 3 to discharge scanned documents from document outlet 206.

Behind operation panel 2 is recording paper inlet 211. Recording paper is set in paper feeding tray 212 that is inserted in this recording paper inlet 211. Above recording paper inlet 211 is recording paper outlet 213 that discharges transferred recording paper.

Behind the interior of operation panel 2 are auto sheet feed (hereafter referred to as "ASF") roller 214, recording paper separation pad 215, recording roller 216, recording paper discharge roller 217 and recording paper pinch roller 218, etc.

ASF roller 214 is placed above supply reel 402 of ink film unit 4. This ASF roller 214 rotates clockwise in FIG. 3 in recording paper transfer operation to carry recording paper to recording position 104. Recording paper passes beneath ASF roller 214.

Recording paper separation pad 215 is placed opposite to ASF roller 214 and stays in contact with ASF roller 214 so that only one sheet can be separated from a plurality of recording paper sheets.

Recording roller 216 is placed opposite to recording head 101. Between this recording roller 216 and recording head 101, ink film 401 is inserted.

Recording roller 216 rotates clockwise in FIG. 3 in recording paper transfer operation to insert recording paper into the gap with ink film 401, provides tension for recording paper and ink film 401 to assist in smooth heat transfer at recording position 104.

Recording paper discharge roller 217 rotates clockwise in FIG. 3 to discharge recording paper after heat transfer from recording paper outlet 213. Recording pinch roller 218 is placed opposite to recording paper discharge roller 217 and assists in carrying recording paper smoothly to recording paper outlet 213 after transfer.

Figure 4:
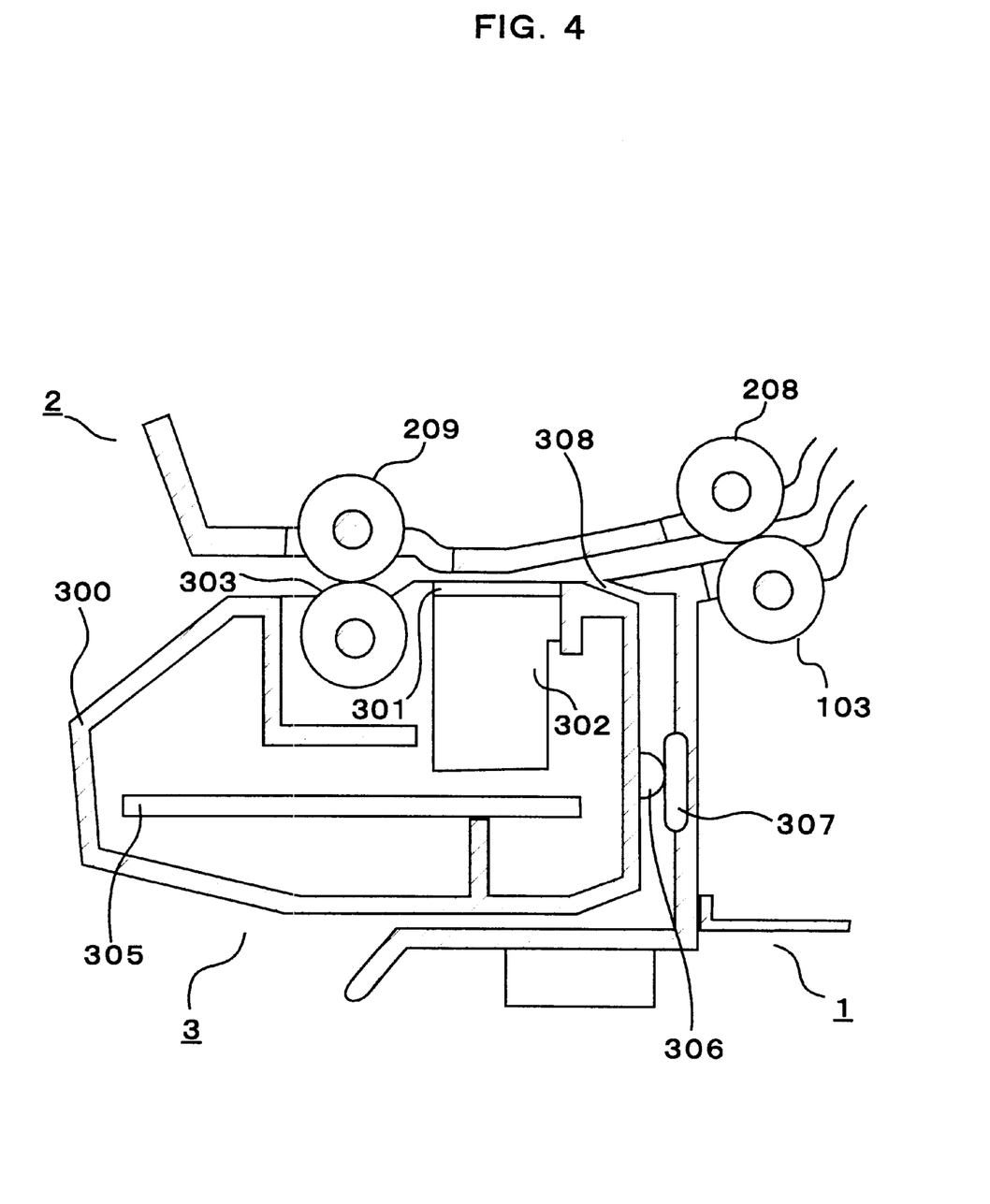
FIG. 4 illustrates an enlarged sectional view of the scanner of the facsimile apparatus according to the embodiment above.

Then, scanner section 3 is explained with reference to FIG. 4. FIG. 4 is an enlarged sectional view of scanner section 3.

As shown in FIG. 4, scanner section 3 is provided at the front of facsimile apparatus main unit 1 and hand scanner 300 is attached to scanner section 3 in a detachable manner via support 305 with the scanning side facing upward. Since scanning operation is carried out with the hand scanner attached or detached, it is possible to scan documents freely without being restrained by the form of a document.

The scanning side of this hand scanner 300 consists of protective glass 301 and scanning unit 302. Scanning unit 302 has such a configuration that an LED light source which is not shown in the figure illuminates a document and the image of the document is formed through a lens optical system on an image sensor which is not shown in the figure.

At the end of the document carrying direction on the scanning side of hand scanner 300 is encoder roller 303. Encoder roller 303 together with a slit wheel, optical system and control block which are not shown in the figure forms an encoder.

At the back of hand scanner 300 is power supply protrusion 306 that receives power supply from facsimile apparatus main unit 1. On the other hand, facsimile apparatus main unit 1 is provided with power supply board 307 that stays in contact with power supply protrusion 306. Furthermore, on the back of hand scanner 300 and the opposite side of facsimile apparatus main unit 1 are infrared ports for data transmission/reception which are not shown in the figure.

In addition, at the front of scanning side of hand scanner 300 in the document carrying direction is chamfer 308. The presence of this chamfer 308 allows incoming documents to be carried forward smoothly to the scanning side without paper jam even if these documents have a certain degree of winding habit or wrinkles. Furthermore, when scanning is carried out with hand scanner 300 detached from scanner section 3, it is possible to push documents beneath hand scanner 300, which allows the hand scanner to slide smoothly across the documents even if they have a certain degree of winding habit or wrinkles.

Then, hand scanner 300 attached to facsimile apparatus main unit 1 in a detachable manner is explained with reference to FIG. 5.

Figure 5:
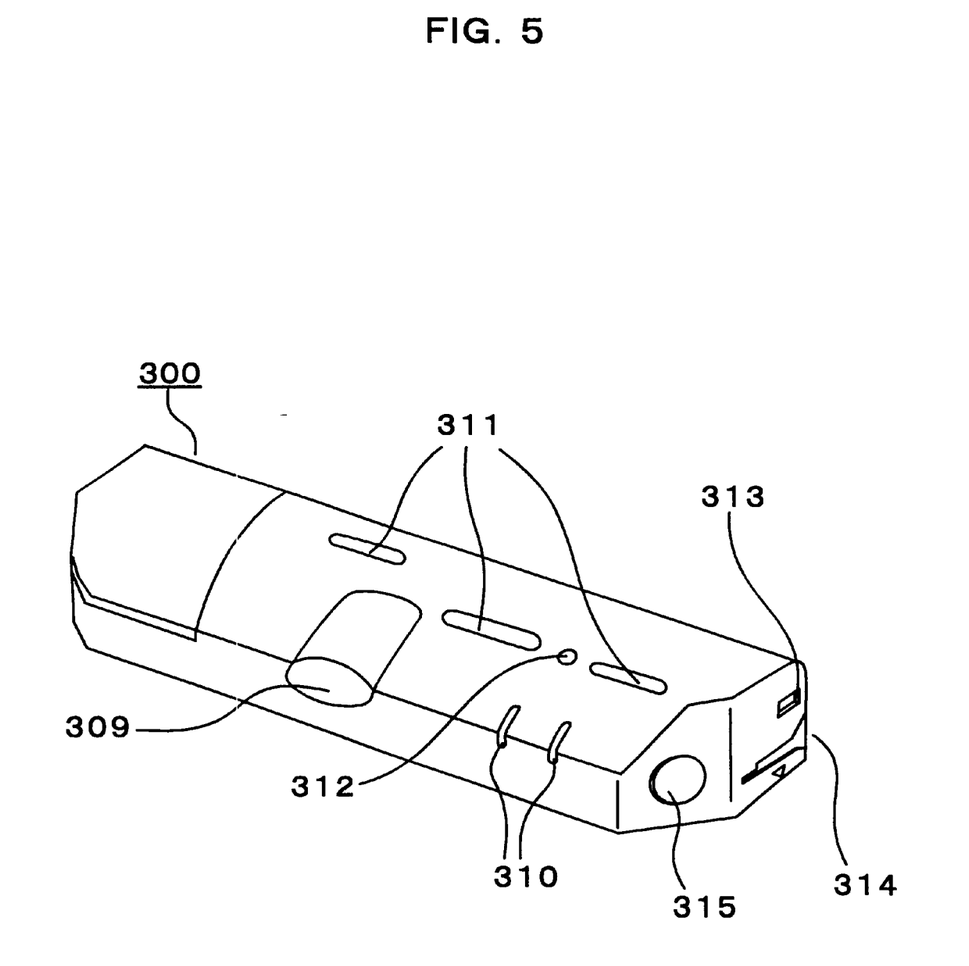
FIG. 5 illustrates an overall perspective view of the hand scanner of the facsimile apparatus according to the embodiment above.

FIG. 5 is an overall perspective view of hand scanner 300. As shown in FIG. 5, hand scanner 300 is placed with its scanning side facing downward. At the center of the upper surface of hand scanner 300 is scanning operation switch 309 that gives a signal for the operator to trigger scanning operation of hand scanner 300.

At the edge of the upper surface of hand scanner 300 are display lamps 310 that indicate that the scanner is charging or scanning. These display lamps 310 have a vertically oblong form that spans the upper and lateral sides of hand scanner 300 in order to allow the operator to recognize them whether the scanner is attached to or detached from the main unit.

Furthermore, on the upper surface of hand scanner 300 are command buttons 311 that allow specification of the document size, erasure of data stored in memory, etc. Operation lamp 312 lights up or goes off to distinguish commands issued from command buttons 311.

Both sides of hand scanner 300 in the document width direction are provided with engagement hole 313 and engagement groove 314 to fasten hand scanner 300 to facsimile apparatus main unit 1. When hand scanner 300 is attached to facsimile apparatus main unit 1, hand scanner 300 is fastened to facsimile apparatus main unit 1 by engaging engagement hole 313 and engagement groove 314 with the engagement section of facsimile apparatus main unit 1 which is not shown in the figure.

Both sides of hand scanner 300 in the document width direction are also provided with concavity 315 to catch the hand scanner by hand to detach it from facsimile apparatus main unit 1.

Then, the operation of the facsimile apparatus configured as shown above according to the present embodiment is explained below.

First, the document scanning operation with hand scanner 300 attached to facsimile apparatus main unit 1 is explained. Prior to scanning of a document, document tray 202 should be opened and the document should be inserted into document inlet 205 in such a way that it touches ADF roller 102.

When the operator presses appropriate operation button 201 to command the start of document scanning, drive motor 117 rotates and the rotation drive is transmitted to ADF roller 102 via cogwheel line 113 and transmission shaft 112. ADF roller 102 rotates counterclockwise in FIG. 3. This action causes one of a plurality of document sheets placed in document tray 202 to be separated from other sheets by document separation pad 207. The separated one sheet is passed over ADF roller 102 by means of frictional force of ADF roller 102 and carried from right to left in FIG. 3.

The documents carried by ADF roller 102 passes between document feed roller 103 and document pinch roller 208 and reaches scanning point 304 of scanning unit 302 of scanner section 3. While being carried by document feed roller 103, document pinch roller 208, document discharge roller 209 and encoder roller 303 this document is scanned by an image sensor which is not shown in the figure through an optical system of scanning unit 302. At this time, the amount of traveling of the document is detected by counting the number of revolutions of a slit wheel connected to encoder roller 303 which is not shown in the figure.

The scanned document passes between document discharge roller 209 and encoder roller 303 and is discharged from document outlet 206.

As seen above, since the facsimile apparatus according to the present embodiment has hand scanner 300 attached to scanner section 3 provided at the front of facsimile apparatus main unit 1 with its scanning side facing upward, it is possible to have such a configuration that will prevent documents being carried through a crooked path during scanning even if the paper feeding cassette carrying plain paper is set in the main unit, making it possible to carry documents smoothly.

Then, the operation of detaching hand scanner 300 from facsimile apparatus main unit 1 is explained with reference to FIG. 6, FIG. 7A and FIG. 7B.

Figure 6:
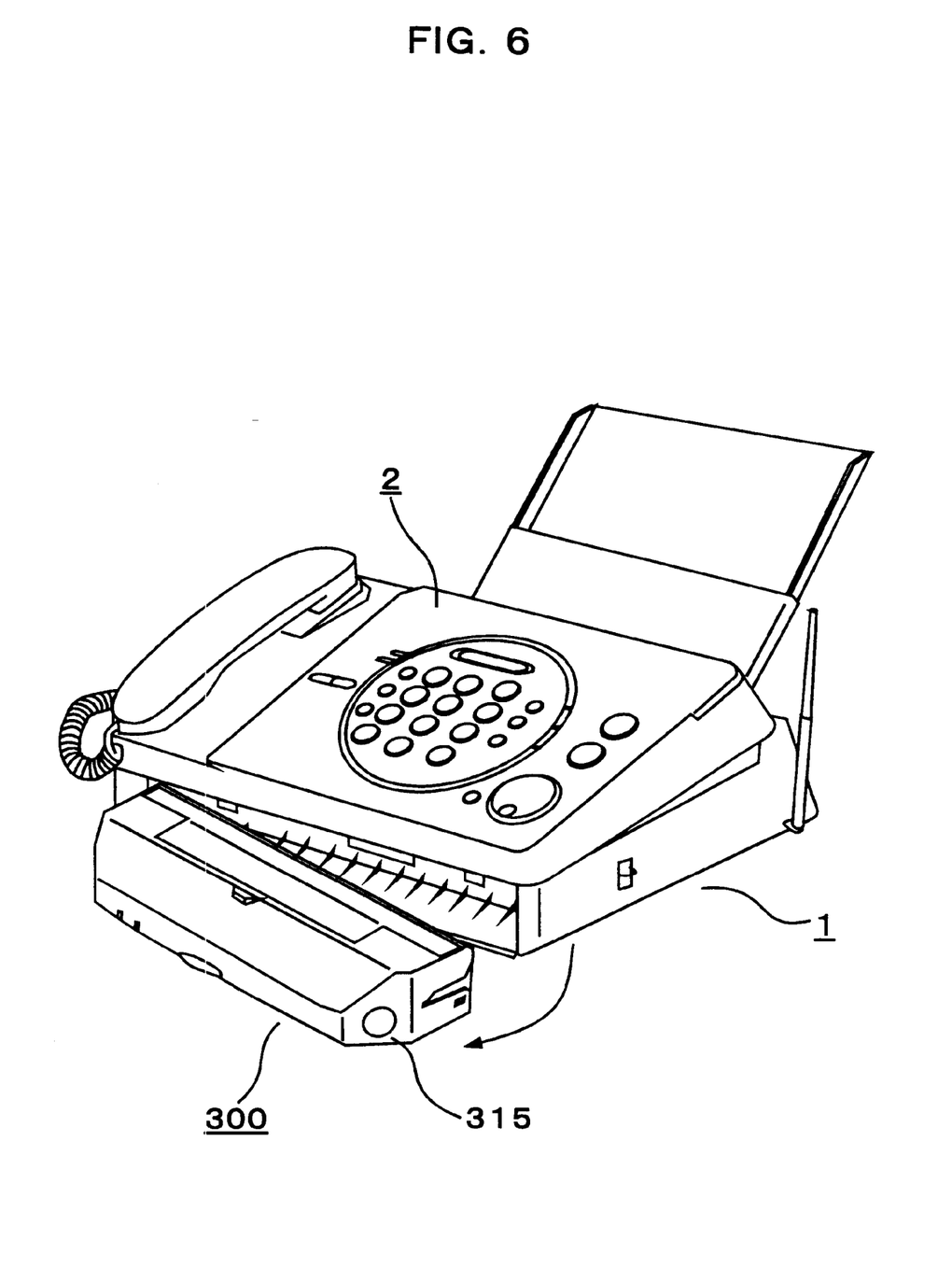
FIG. 6 illustrates an overall perspective view of the hand scanner of the facsimile apparatus according to the embodiment above detached from the facsimile apparatus.
Figure 7A:
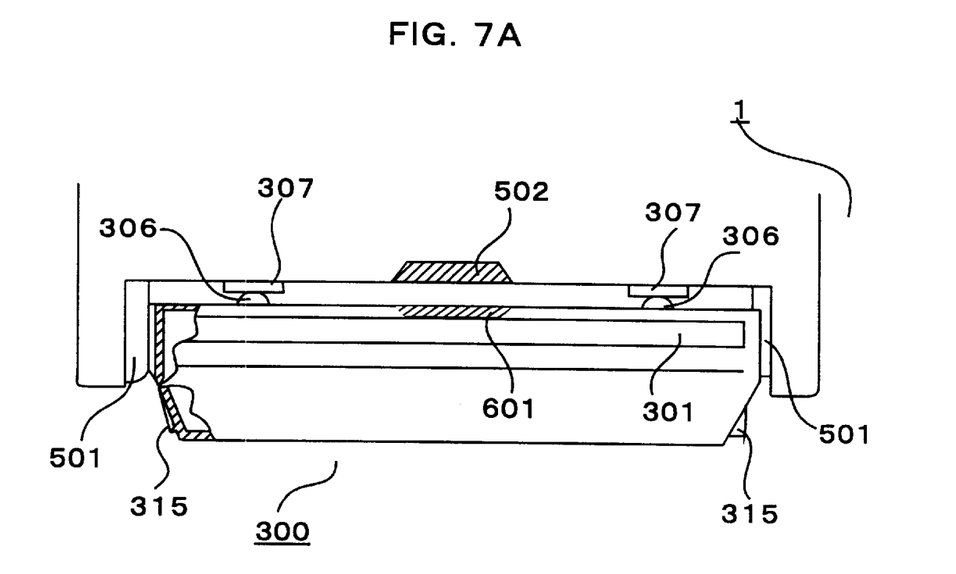
FIG. 7A illustrates an enlarged sectional view of the hand scanner of the facsimile apparatus according to the embodiment above attached to the scanner section.
Figure 7B:
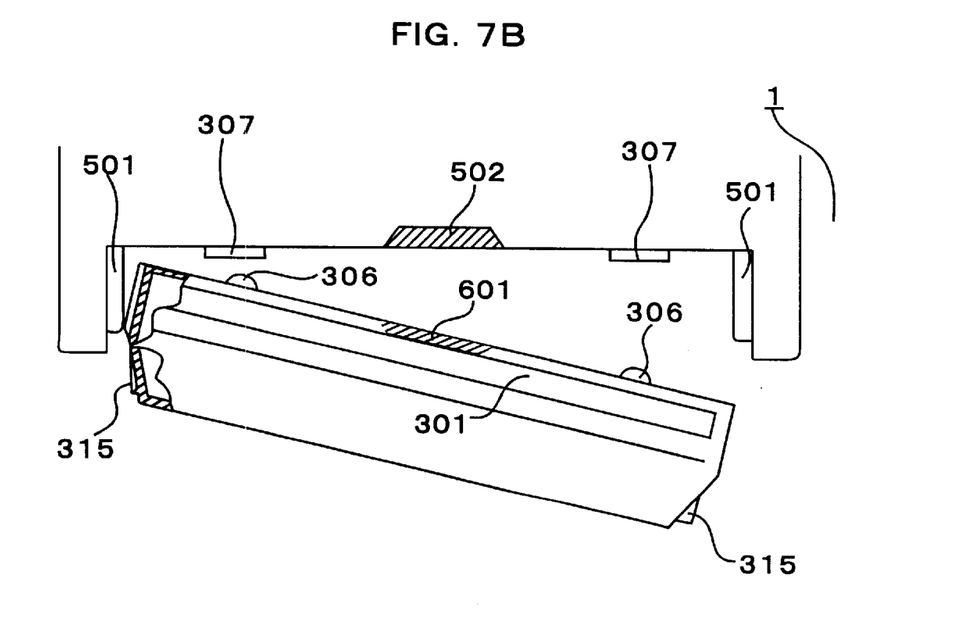
FIG. 7B illustrates an enlarged sectional view of the hand scanner of the facsimile apparatus according to the embodiment above detached from the scanner section.

FIG. 6 is an overall perspective view showing how hand scanner 300 is detached from facsimile apparatus main unit 1. FIG. 7A is an enlarged top view of scanner section 3 with hand scanner 300 attached to scanner section 3. FIG. 7B is an enlarged top view of scanner section 3 with hand scanner 300 detached from scanner section 3.

First, the operator catches hand scanner 300 by concavity 315 with one hand and pulls it out forward. This allows hand scanner 300 to be removed easily by describing an arc centered on the engagement section provided opposite to concavity 315.

Then, the document scanning operation with hand scanner 300 detached from facsimile apparatus main unit 1 is explained.

The operator holds hand scanner 300 and places it on the document to be scanned, checks the scanning position and then slides it across the document to be scanned while holding down scanning operation switch shown in FIG. 5. The document is scanned by an image sensor which is not shown in the figure through an optical system of scanning unit 302. At this time, the amount of traveling of the document is detected by counting the number of revolutions of a slit wheel connected to encoder roller 303 which is not shown in the figure. The scanned image data is stored in a memory which is built in hand scanner 300.

Hand scanner 300 according to the present embodiment is of a cordless type, and therefore it is free of cords which may be an obstacle to scanning operation. Thus, the operator can perform scanning operation with a free space without regard to the location of facsimile apparatus main unit 1.

Figure 8:
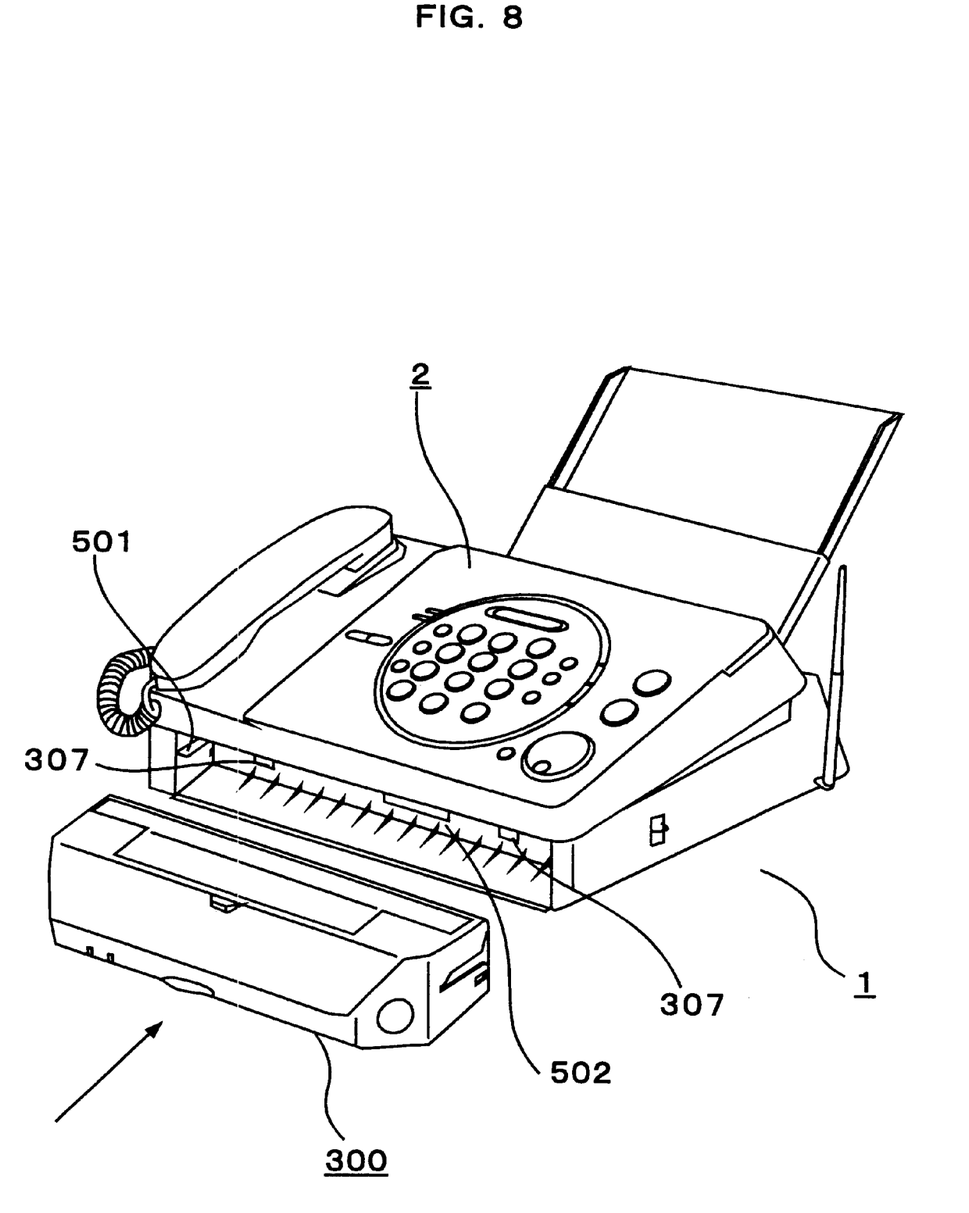
FIG. 8 illustrates an overall perspective view showing how the hand scanner of the facsimile apparatus according to the embodiment above is attached to the facsimile apparatus main unit.

Then, the attaching operation of hand scanner 300 is explained with reference to FIG. 7A and FIG. 7B above and FIG. 8. FIG. 8 is an overall perspective view showing how hand scanner 300 is attached to facsimile apparatus main unit 1.

When a scan of the document is completed, the operator inserts hand scanner 300 into scanner section 3 of facsimile apparatus main unit 1 in the direction shown by an arrow with the scanning side facing upward. At this time, engagement hole 313 and engagement groove 314 of hand scanner 300 engage with engagement section 501 provided in facsimile apparatus main unit 1.

When hand scanner 300 is attached to facsimile apparatus main unit 1, power supply protrusion 306 provided on the back of hand scanner 300 comes into contact with power supply board 307 provided in facsimile apparatus main unit 1, allowing power to be supplied to hand scanner 300. When hand scanner 300 is attached to scanner housing section 3, power supply board 307 which is a conductive material is placed in the innermost position of the scanner housing section, which constitutes no obstacle to document travelling, allowing smooth document scanning operation. It also prevents the conductive material from getting dirt, avoiding deterioration of the appearance of the apparatus. In addition, since power supply board 307 is separated from the position at which the operator holds hand scanner 300 during a scan with hand scanner 300 detached from scanner housing section 3, it constitutes no obstacle to the document scanning operation.

The built-in battery of hand scanner 300 which is not shown in the figure is charged with this power supply. Furthermore, when power is supplied to hand scanner 300, the image data stored in memory is transferred from infrared port 601 provided on the back of hand scanner 300 to infrared photo-receptor 502 provided on facsimile apparatus main unit 1. The ability to transfer scanned image data without any cords connected implements a cordless hand scanner. Furthermore, when the hand scanner is attached to the scanner housing section, the infrared emission section is located in the innermost part of the scanner housing section, which constitutes no obstacle to document travelling allowing smooth document scanning operation. It also prevents the infrared photo-receptor from getting dirt, avoiding deterioration of the appearance of the apparatus. Furthermore, since the infrared emission section and infrared photo-receptor are placed face to face, data transfer can be assured without interruption even if the voltage of the built-in battery of the hand scanner drops.

By the way, data transfer is possible irrespective of whether hand scanner 300 is attached or detached.

Then, the recording paper transfer operation of the facsimile apparatus according to the present embodiment is explained below. Prior to recording paper transfer, ink film unit 4 should be set in facsimile apparatus main unit 1 beforehand. Also paper feeding tray 212 should be set in recording paper inlet 211 and recording paper should be inserted into recording paper inlet 211 in such a way that it comes into contact with ASF roller 214.

First, drive motor 117 starts to rotate by a data reception signal from the receiving section which is omitted in the figure or by the operator's pressing the operation button. Then, the rotation drive of drive motor 117 is transmitted to ASF roller 214 via cogwheel line 113 and transmission shaft 115 and ASF roller 214 rotates clockwise in FIG. 3. When this ASF roller 214 rotates, one of recording paper sheets set in paper feeding tray 212 is separated from other sheets by recording paper pad 215 and carried from right to left in FIG. 3 passing beneath ASF roller 214 by means of frictional force of ASF roller 214.

The recording paper carried by ASF roller 214 reaches recording position 104 between recording roller 216 and ink film 401. It is further carried while receiving tension from recording roller 216 and winding reel 402 of ink film unit 4 rotates in synchronization with the travelling of recording paper and image data in memory on the board which is not shown in the figure is transferred to recording paper by recording head 101.

The recording paper with transferred image data is carried toward the outlet by recording roller 216 and further carried toward paper feeding tray 212 by the frame guide of operation panel 2. Then, it passes between recording paper discharge roller 217 and document pinch roller 218 and is discharged from recording paper outlet 213.

As seen from the explanation above, setting hand scanner 300 in scanner section 3 provided at the front of facsimile apparatus main unit 1 facing upward prevents crooked document travelling paths, allowing smooth travelling of documents. This also rationalizes the overall configuration of the facsimile apparatus, making it possible to reduce the size of the apparatus.

What is claimed is:

1. A facsimile apparatus, comprising:
   a hand scanner that scans image data, said hand scanner being provided with an infrared emission section, and
   a scanner housing section provided in a facsimile apparatus main unit, and that detachably holds said hand scanner, said scanner housing section being provided with an infrared photo-receptor positioned opposite to a position of the infrared emission section of the hand scanner when said hand scanner is housed in the scanner housing section;
   wherein said hand scanner transfers the scanned image data to the facsimile apparatus main unit by the infrared emission section and the infrared photo-receptor when said hand scanner is housed in said scanner housing section.

2. A facsimile apparatus, comprising:
   a hand scanner that scans image data and transfers the scanned image data to a main unit of the facsimile apparatus;
   a scanner housing section that detachably receives said hand scanner, said scanner housing section positioning said hand scanner with a document scanning side facing upward;
   a first electrically conductive material provided on said hand scanner, and
   a second electrically conductive material provided on said scanner housing section;
   wherein, when said hand scanner is positioned in said scanner housing section, said first conductive material electrically contacts said second conductive material so that said hand scanner can receive power from the facsimile apparatus main unit thorough said first and second electrically conductive materials;
   wherein said hand scanner is detachable from said scanner housing section along an arc centered on one end of a scanning width direction.

3. The facsimile apparatus according to claim 2, wherein said scanner housing section is provided in a lower part of a front of the main unit of the facsimile apparatus.

4. The facsimile apparatus according to claim 2, wherein said hand scanner is provided with display lamps at locations visible from both an upper surface and a front surface when said hand scanner is one of attached to the main unit and detached from the main unit.

5. The facsimile apparatus according to claim 2, further comprising a paper feeding tray in which paper can be provided.

6. A facsimile apparatus, comprising:
   a hand scanner that scans image data and transfers the scanned image data to a main unit of the facsimile apparatus;
   a scanner housing section that detachably receives said hand scanner, said scanner housing section positioning said hand scanner with a document scanning side facing upward;
   a first electrically conductive material provided on said hand scanner, and
   a second electrically conductive material provided on said scanner housing section;
   wherein, when said hand scanner is positioned in said scanner housing section, said first conductive material electrically contacts said second conductive material so that said hand scanner can receive power from the facsimile apparatus main unit thorough said first and second electrically conductive materials;
   wherein said hand scanner has a chamfer at a front of a scanning side, in the document carrying direction, so as to let incoming documents move to the scanning side.

7. The facsimile apparatus according to claim 6, wherein said scanner housing section is provided in a lower part of a front of the main unit of the facsimile apparatus.

8. The facsimile apparatus according to claim 6, wherein said hand scanner is detachable from said scanner housing section in the width direction of the facsimile apparatus main unit.

9. The facsimile apparatus according to claim 6, wherein said hand scanner is detachable from said scanner housing section along an arc centered on one end of a scanning width direction.

10. The facsimile apparatus according to claim 6, further comprising a paper feeding tray in which paper can be provided.

* * * * *